United States Patent
Lautenschlager

[11] Patent Number: 5,570,982
[45] Date of Patent: Nov. 5, 1996

[54] SCREW HOLE WITH PREINSTALLED SCREW

[75] Inventor: Gerhard W. Lautenschlager, Brensbach-Wersau, Germany

[73] Assignee: MEPLA-Werke Lautenschlager GmbH & Co. KG, Germany

[21] Appl. No.: 256,331

[22] PCT Filed: Nov. 10, 1993

[86] PCT No.: PCT/EP93/03138

§ 371 Date: Sep. 20, 1994

§ 102(e) Date: Sep. 20, 1994

[87] PCT Pub. No.: WO94/11604

PCT Pub. Date: May 26, 1994

[30] Foreign Application Priority Data

Nov. 17, 1992 [DE] Germany ............ 42 38 792.2

[51] Int. Cl.$^6$ .................................. F16B 19/00
[52] U.S. Cl. .................. 411/355; 411/368; 411/999
[58] Field of Search ................... 411/355, 368, 411/369, 370, 999, 107, 970

[56] References Cited

U.S. PATENT DOCUMENTS

| | | | |
|---|---|---|---|
| 2,010,853 | 8/1935 | Dyer | 411/999 |
| 2,272,170 | 2/1942 | McDowell | 411/999 |
| 3,339,952 | 9/1967 | Beckman | 411/999 |
| 3,556,570 | 6/1971 | Cosenza | 411/999 |
| 3,878,042 | 4/1975 | Curulla | 411/999 |
| 4,768,259 | 9/1988 | Rock | 411/533 |
| 5,069,051 | 12/1991 | Olah | |

FOREIGN PATENT DOCUMENTS

| | | |
|---|---|---|
| 6923017 | 6/1969 | Germany. |
| 2907415 | 9/1980 | Germany. |
| 2046757 | 9/1983 | Germany. |
| 3444851 | 6/1986 | Germany. |
| 3622001 | 7/1990 | Germany. |

OTHER PUBLICATIONS

DIN 7952, Jan. 1972 "Blechdurchzüge mit Gewinde" (Sheet metal anchorage with threads), pp. 146–152.

Primary Examiner—Flemming Saether
Attorney, Agent, or Firm—Dvorak and Traub

[57] ABSTRACT

The present invention relates to a screw hole (12) in hardware parts (10), especially in metal furniture hardware, in which is screw with a given outside thread diameter provided with a truncoconical countersink head can be preinstalled. The hole (12) has a countersink (18) matching the truncoconical head of the screw, followed by a substantially cylindrical hole section (20) for the passage of the shaft of the screw. The inside diameter of the cylindrical hole section (20) is slightly smaller than the outside diameter of the screw shaft measured across the threads of the screw (14), and into the cylindrical hole section an internal thread (24) is worked into the cylindrical hole section, where the length of the threaded shaft as measured in the screw driving direction is shorter than that of the unthreaded shaft section of the screw adjoining the bottom of the countersink head.

4 Claims, 2 Drawing Sheets

SCREW HOLE WITH PREINSTALLED SCREW

BACKGROUND OF THE INVENTION

1. Field of the Invention

The invention relates to a screw hole in furniture fittings, especially in metal hardware for furniture, in which a screw provided with a truncoconical countersink head and having a thread of a given outside diameter is preinstalled, wherein the hole has a countersink shaped to complement the truncoconical head of the screw and adjoined by a substantially cylindrical section to accommodate the shaft of the screw. The invention also concerns a method for the production of such holes in hardware made of thin sheet metal.

In hardware that is to be fastened by screws to pieces of furniture, e.g., mounting plates for furniture hinges, it is common practice to preinstall the screws on the hardware part, so that when the latter is mounted on a cabinet wail the hardware part needs only to be placed at the intended mounting position with its preinstalled screws aligned with the holes predrilled in the furniture and the screws to be driven in with a screwdriver. To achieve sufficient strength in the screw connection, screws with relatively coarse threads are used, so-called "Euro screws" being increasingly used of late, the threads of which have a relatively coarse crest, which on the one hand permits the screws to be driven with comparatively little effort into holes in wood materials, but due to the comparatively deep penetration of the threads into the walls of the hole they can withstand heavier loading and still permit repeated installation and removal of the hardware.

To assure that the preinstalled screws will be held securely in the preinstallation position, i.e., will neither drop out nor tilt away from their position at right angles to the hardware surface, a relatively tight fit must be provided between the top end of the screw's shaft and the hole.

This has been accomplished in the case of thick hardware (DE-PS 34 44 851) by making the wall of the hole holding the shaft of the screw slightly smaller than the outside diameter of the shaft of the screw, so that the crests of the threads can easily penetrate into the wall of the hole during preinstallation and cut a shallow holding thread by themselves, so to speak.

2. The Prior Art

In the case of hardware of thin sheet metal, in which the hole thus has such a short length that a thread holding the screw securely can hardly be produced, a solution to this has been found (DE-PS 36 22 001) in which a circular area extending over about 270° is stamped out of the area of material adjoining the hole or, more correctly, the punched hole, and shaped out of the plane of the sheet metal to correspond to the pitch of the screw thread. Thus a thread is formed which suffices to hold the screw, especially abovementioned Euro screw, securely in the punched hole. Of course, free space must be available to correspond to the thread formed out of the plane of the material, i.e., sheet-metal hardware of this kind must be embossed at least in the area of the punched fastening holes to form the necessary hollow space. When the screws are driven into the corresponding holes, the unthreaded section at the upper end of the screw shaft adjoining the screw head and having a diameter smaller than the outside diameter of the threads comes into the reach of the punched thread and the screw can then turn freely without binding, i.e., the piece can be screwed tightly onto the corresponding cabinet wall in the required manner.

The invention is addressed to the problem of devising a configuration for screw holes in hardware parts which will permit secure preinstallation of flat-head screws, and which on the other hand will be usable both in hardware of great material thickness and especially in hardware of thin sheet metal, while it will be possible for the part in question to be forced with its bottom into tight contact with the cabinet wall without routing out the area around the mounting hole. At the same time the hardware piece provided with the holes in question is also to be installable even without preassembly and with screws of different threading or smaller-shaft diameter if their heads fit into the countersink around the hole.

Setting out from a hole of the kind described above, this problem is solved in accordance with the invention in that the inside diameter of the cylindrical section of the hole is slightly smaller than the outside diameter of the screw shaft measured across its threads, and in that a thread is provided in the cylindrical section of the hole to accommodate the thread of the screw shaft, and has a length that is shorter than the unthreaded portion of the shaft adjoining the screw head. Hardware with holes thus configured can, of course, also be installed without a preinstalled, mating screw, so that flat-head screws with nonconforming shafts, e.g., of different screw pitch, different size can be used, as long as it is certain that the head will fit into the countersink around the hole. Then, if screws with an outside thread diameter that is smaller than the inside diameter of the threaded section of the hole are used, screws can also be used whose thread runs over the entire length of their shaft, i.e., reach all the way to their heads.

The root diameter of the thread in the cylindrical section of the hole can be less than the crest diameter of the threaded shaft, in which case it is recommendable to configure the thread of the cylindrical section of the hole so that the threads of the pre-installed screw are held in the hole with a light force fit.

The end of the substantially cylindrical, threaded hole section remote from the countersunk portion is expediently adjoined by a short hole section of expanding diameter, whose diameter at the bottom of the hardware piece facing away from the countersunk portion is approximately equal to or slightly larger than the outside diameter of the screw measured across the threads.

In hardware of thin sheet metal, the fastening hole is produced in accordance with the invention such that, in the flat sheet metal blank, first a hole of small diameter is punched, and the area of the sheet metal adjoining the hole is then forced upward to form a substantially cylindrical projection protruding above the upper side of the metal blank, and having an inside diameter substantially equal to the inside diameter of what will later be the substantially cylindrical hole section, and then at least a portion of the cylindrical projection raised above the upper surface of the metal blank is flared by means of a punch with a conical face pressed into it, and then finally the thread is produced in the remaining cylindrical hole section.

The thread can be made either by a noncutting method or it can be cut into the cylindrical hole section.

BRIEF DESCRIPTION OF THE DRAWINGS

The invention is further explained in the following description of two embodiments, in conjunction with the drawing, wherein.

DETAILED DESCRIPTION OF THE DRAWINGS

Figure 1:
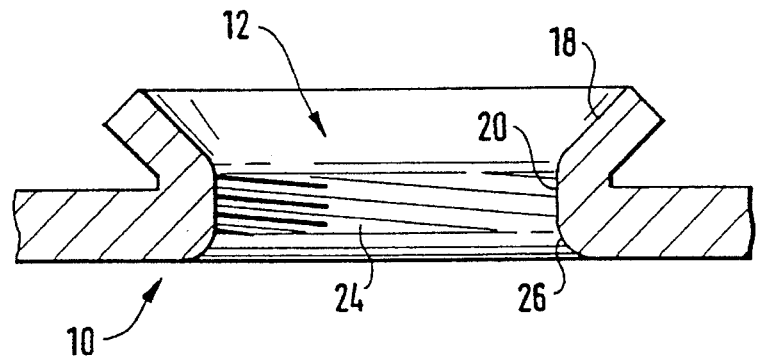
FIG. 1 is a cross-sectional view, on a scale considerably enlarged in comparison with the actual size, through a screw hole configured in the manner of the invention and provided in a piece of hardware made from thin sheet metal.
Figure 3:
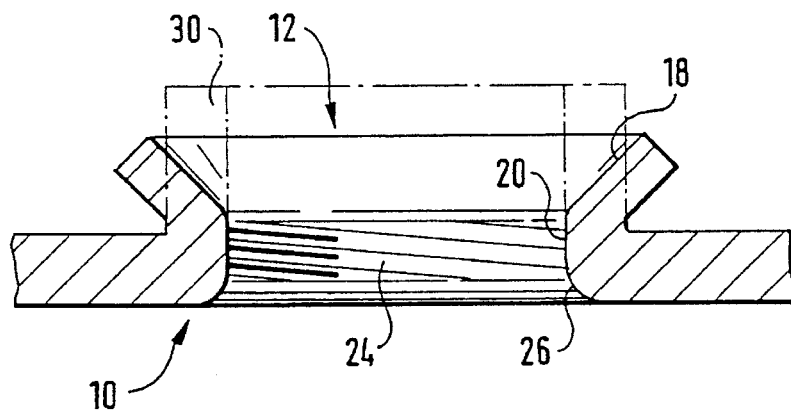
FIG. 3 is a cross-section corresponding to that of FIG. 4, in which an intermediate stage in the production of the fastening hole is additionally drawn in broken lines.
Figure 4:
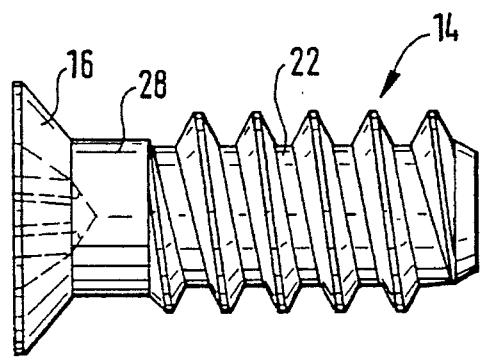
FIG. 4 is a side view wherein a flat-headed screw which can be pre-installed in the holes configured according to the invention is shown in a smaller scale than in FIGS. 1 to 3, but one that is still larger than the original size.

FIG. 1 (and FIG. 3) is a considerably enlarged view of a portion of a piece of hardware of sheet steel with a fastening hole 12 made in accordance with the invention for a flat-headed screw 14 (FIG. 4). The hole 12 has a countersink 18 made to fit the flat head 16 of the screw 14 when it is driven entirely into the mounting hole on a cabinet wall which is not shown. The countersink 18 is adjoined by a basically cylindrical hole section 20 in which, however, an internal thread 24 has been rolled or cut which is complementary to the thread of the threaded section 22 of the shaft of the screw 14. The cylindrical section 20 provided with the internal thread 24 is then adjoined by another short, flaring section 26 of the hole, whose diameter increases toward the bottom of the hardware piece to a size that is at least equal to or slightly larger than the outside diameter of the shaft of the screw 14 measured across the threads.

The length of the threaded cylindrical hole section is shorter than a short, unthreaded section 28 of the shaft of the screw 14 provided between the head 16 and the threaded section 22, and the diameter of the unthreaded section 28 of the shaft is furthermore smaller than the inside diameter of hole section 20. It is clear that pre-assembly of the screw 16 in hole 12 is possible because the front end of the shaft is driven into the internal thread 26 of hole section 20. If a slightly tight fit is provided between the screw and the internal thread 26, the pre-installed screw 14 will be held securely in hole 12 until it is driven into a pre-drilled hole in the substrate upon installation.

Figure 2:
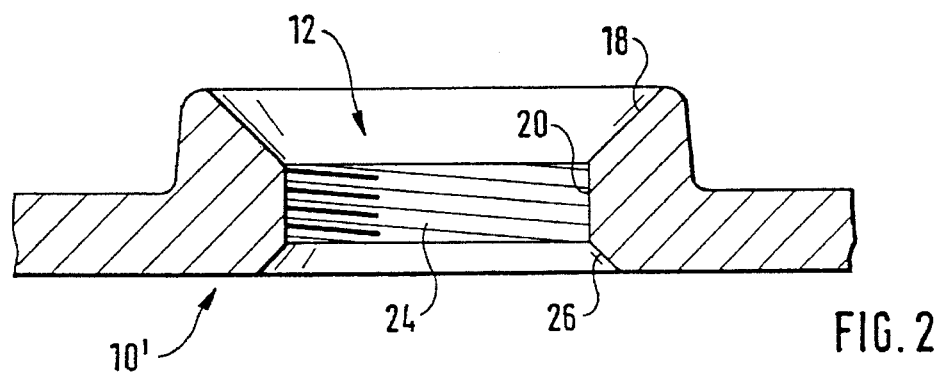
FIG. 2 is a cross-sectional view through a similar fastening hole in a thicker piece of hardware of pressure-cast metal.

In FIG. 2 there is represented a screw hole formed basically in the same manner in a section made by pressure casting from metal in a hardware part 10'. Since identical sections of hole 12 are provided with the same reference numbers it will be sufficient here to refer to the preceding description of the embodiment shown in FIG. 1.

FIG. 3 corresponds to FIG. 1, but an intermediate form that the hardware part 10 has during manufacture is represented in broken lines. The countersink 18 is first formed from a cylindrical projection 30 made first by stamping a hole and deforming the area of the material surrounding the hole, this deformation being performed by forcing down into the cylindrical projection 30 a punch having a face complementary to the countersink. The originally cylindrical projection 30 is thus shaped to a flaring projection which can be seen in FIGS. 1 and 3. The internal thread 24 is then either made by a noncutting method by rotating an appropriate threading mandrel or cut by means of a threading tap in the cylindrical section 20.

It is apparent that modifications and further developments of the embodiments described can be made within the scope of the idea of the invention. It is to be noted that the intended hole in the case represented for pre-installation of so-called "Euro screws" can also be reconfigured by appropriate dimensional adaptation such that ordinary wood screws or even so-called particle board screws or Spax screws can be pre-installed. On the other hand, hardware parts can also be fastened with the screws described and represented in the drawings and also with flat-head wood screws or toggle bolts or expansion plug screws. Since the flat head of the last-named screws is considerably larger in relation to the shaft diameter than the flat head 16 of the Euro screw shown in FIG. 4, the shaft diameter of a wood screw suitable for the hole 12 is definitely smaller than the shaft diameter of the screw 14, so that the threaded shaft can be passed without difficulty through the hole section 20 provided with the internal thread 24. But pre-installation of these screws of smaller shaft diameter is not possible.

Figure 5:
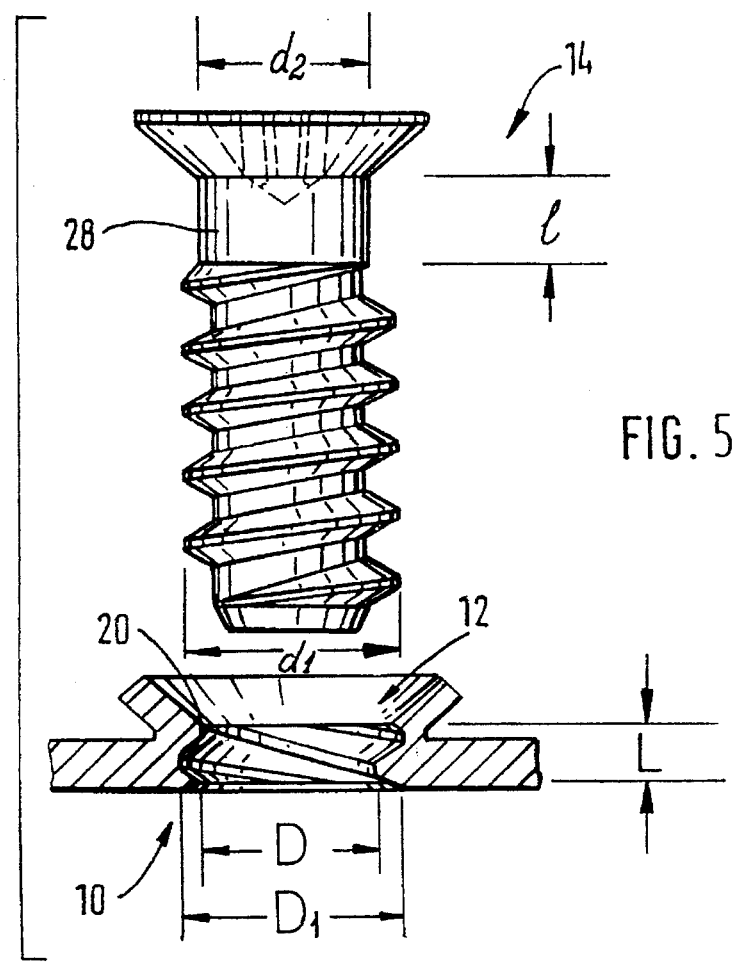
FIG. 5 is a cross-sectional view of the screw aligned with the hole and illustrating relative diameters.
Figure 6:
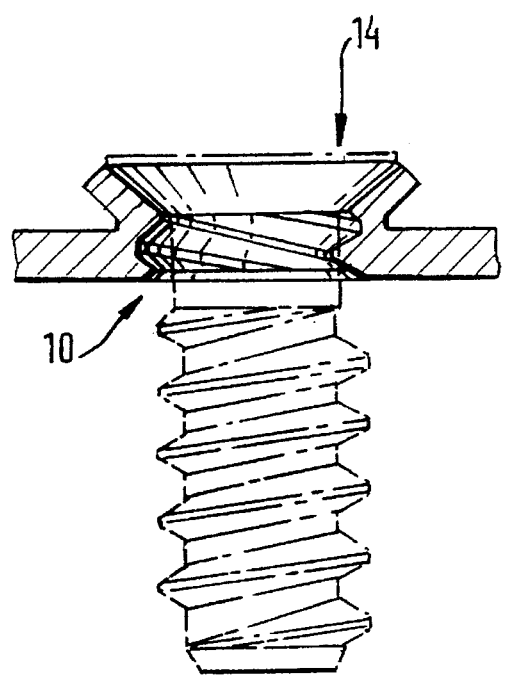
FIG. 6 is a cross-sectional view of the hole with the screw in preinstalled position.

In FIG. 5, the screw 14 is shown in alignment with the hole 12, prior to preinstallation and illustrates the relative diameters and lengths of parts of the hole and the screw. The cylindrical hole section 20 has an inside diameter D that is slightly smaller than the outside diameter $d_1$ of the screw shaft measured across the threads of the screw 14, but yet is slightly greater than the diameter $d_2$ of the threadless shaft section 28. The internal thread section of the hole 20 has a length L that is measured in the driving direction of the screw, which is shorter than the length 1 of the threadless shaft section 28, measured in the same direction.

I claim:

1. A screw hole (12) in hardware pieces (10), having a preinstalled screw provided with a truncoconical countersink head (16) and having a threaded shaft section (22) of given outside thread diameter ($d_1$) and a threadless shaft section (28) between the countersink head and the threaded shaft section, the diameter ($d_2$) of which is smaller than the diameter of the threaded shaft section, the screw hole (12) having a countersink (18) of a shape complementary to the truncoconical countersink head (16) of the screw and having a substantially cylindrical hole section (20) disposed adjacent in the countersink for the passage of the shaft of the screw: comprising said cylindrical hole section (20) having an inside diameter (D) that is slightly smaller than an outside diameter ($d_1$) of the screw shaft measured across the threads of the screw (14) and slightly greater than the diameter ($d_2$) of the threadless shaft section (28), and said cylindrical hole section (20) having an internal thread section (24) that receives the threaded shaft (22) of the screw (14) in the preinstalled state, wherein said internal thread section (24) has a length (L) measured in a driving direction which is shorter than length (1) of the threadless shaft section (28) of the screw (14), and wherein the depth of the threads of the internal thread section (24) in the cylindrical hole section (20) is smaller than the height of the threads of the threaded shaft section (22) of the screw (14).

2. The screw hole according to claim 1, wherein the threads in the internal thread section (24) of the cylindrical hole section (20) are so configured that the threads of the threaded shaft section (22) of the pre-installed screw (14) are held in the hole (12) with a light force fit.

3. The screw hole according to claim 1, wherein a short hole section (26) expanding in diameter adjoins the end of the substantially internal thread section (24) opposite the countersink (18), and its diameter ($D_1$) at the bottom side, remote from the countersink, is approximately equal to or slightly greater than the outside diameter ($d_1$) of the shaft of the screw (14).

4. The screw hole according to claim 1, wherein the internal diameter (D) of the hole (20) is smaller than the outside diameter ($d_2$) of the unthreaded section (28) of the shaft of the screw (14).

* * * * *